UNITED STATES PATENT OFFICE.

ROBERT E. BRUCE, OF LANCASTER, PENNSYLVANIA.

ROOF-PAINT.

SPECIFICATION forming part of Letters Patent No. 263,317, dated August 29, 1882.

Application filed June 20, 1882. (No specimens.)

*To all whom it may concern:*

Be it known that I, ROBERT E. BRUCE, a citizen of the United States, residing at Lancaster, in the county of Lancaster and State of Pennsylvania, have invented a new and useful composition of matter to be used for painting the roofs of houses and iron fences, of which the following is a specification.

My composition consists of the following ingredients, combined in the proportions stated, viz: benzine, six gallons; sulphate of iron, two pounds; oxide of iron, ten pounds; asphaltum varnish, two gallons; oxide of lead, three pounds; japan, one quart; umber, (burnt,) five pounds; hard rubber, (in a crude state,) one pound; bisulphate of carbon in proportions for dissolving the rubber; coal-tar, thirty-seven gallons. The hard rubber is dissolved by means of the bisulphate of carbon in a vessel separately and apart from the other ingredients and placed, in a dissolved state, in a vessel containing the other ingredients, which are thoroughly mixed by proper agitation.

I use the above composition as a roof-paint, and apply it to all kinds of roofs with effects which demonstrate its superior virtues as a roof-paint; but its excellence is pre-eminent as a paint for tin and iron roofs. The sulphate of iron and oxide of lead perform the functions of drying, hardening, and of rendering durable the composition, and the effect of their action is that, whereas the period of thirty-six or of forty-eight hours of continuous dry weather after the paint is put on is required in other roof-paints to cause the paint to dry, my roof-paint will set and harden within two hours after the paint is put on sufficiently to prevent injury from rain. It is entirely impervious to water, will not crack or blister, and is unaffected by the extremes of either heat or cold, and with the above qualities combines cheapness and durability.

I am aware that on November 26, 1878, and on June 24, 1879, Letters Patent issued to Wm. G. Elliott and to John R. Hazelet, respectively of Williamsport, Pennsylvania, for improvements in roof-paint; but I am not aware that all of the ingredients of my composition in the proportions stated have ever been used together, and I am not aware that sulphate of iron and oxide of lead have ever been used in a compound for painting roofs and iron fences.

What I claim, and desire to secure by Letters Patent of the United States, is—

The herein-described composition of matter to be used for painting the roofs of houses and iron fences, consisting of benzine, sulphate of iron, oxide of iron, asphaltum varnish, oxide of lead, japan, burnt umber, hard rubber, bisulphate of carbon, and coal-tar, in the proportions specified.

R. E. BRUCE.

Witnesses:
WM. HENRY BROWNE,
ALFRED CLUM.